US012247535B2

(12) United States Patent
Fernandes et al.

(10) Patent No.: US 12,247,535 B2
(45) Date of Patent: *Mar. 11, 2025

(54) INERTIAL SEPARATOR AND METHOD OF USE

(71) Applicant: Pall Corporation, Port Washington, NY (US)

(72) Inventors: Luiz Claudio Vieira Fernandes, Port Washington, NY (US); Jianxiao Liu, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/990,969

(22) Filed: Nov. 21, 2022

(65) Prior Publication Data

US 2024/0167440 A1    May 23, 2024

(51) Int. Cl.
  *B01D 45/16* (2006.01)
  *B04C 3/06* (2006.01)
  *F02M 35/022* (2006.01)
  *F02M 35/10* (2006.01)
  *B04C 3/00* (2006.01)

(52) U.S. Cl.
  CPC ......... *F02M 35/0226* (2013.01); *B01D 45/16* (2013.01); *B04C 3/06* (2013.01); *F02M 35/10262* (2013.01); *B04C 2003/006* (2013.01)

(58) Field of Classification Search
  CPC .. B01D 45/12; B01D 2265/021; B01D 45/16; B04C 2003/006; B04C 3/04; B04C 3/06; F02M 35/0223
  See application file for complete search history.

(56) References Cited

U.S. PATENT DOCUMENTS

| | | | | |
|---|---|---|---|---|
| 3,360,909 A | * | 1/1968 | Barnerias | B04C 5/081 209/722 |
| 3,895,930 A | * | 7/1975 | Campolong | B04C 3/00 55/423 |
| 3,915,679 A | * | 10/1975 | Roach | B04C 3/06 55/423 |
| 3,930,816 A | * | 1/1976 | Miczek | B01D 47/06 96/358 |
| 4,141,705 A | * | 2/1979 | Campolong | B04C 3/00 55/423 |
| 4,144,043 A | * | 3/1979 | Johnston | B01D 50/00 209/710 |

(Continued)

FOREIGN PATENT DOCUMENTS

| | | |
|---|---|---|
| EP | 0 344 749 A2 | 6/1989 |
| IL | 90502 A | 1/1994 |

(Continued)

OTHER PUBLICATIONS

European Patent Office, Extended European Search Report issued in counterpart European Patent Application No. 23202793.8, mailed on Mar. 21, 2024.

(Continued)

*Primary Examiner* — Dung H Bui
(74) *Attorney, Agent, or Firm* — Leydig, Voit & Mayer, Ltd.

(57) ABSTRACT

An inertial separator including an inlet tube with an undercut, an outlet tube with a spiral ramp, and a scavenge flow outlet, is disclosed.

12 Claims, 12 Drawing Sheets

(56) References Cited

U.S. PATENT DOCUMENTS

| | | | | |
|---|---|---|---|---|
| 4,162,906 A * | 7/1979 | Sullivan | | B04C 3/00 |
| | | | | 210/512.1 |
| 4,179,273 A * | 12/1979 | Montusi | | B01D 21/265 |
| | | | | 210/512.1 |
| 4,255,174 A * | 3/1981 | Simpson | | F02C 7/052 |
| | | | | 55/306 |
| 4,289,611 A * | 9/1981 | Brockmann | | B04C 3/06 |
| | | | | 209/710 |
| 4,537,608 A * | 8/1985 | Koslow | | B01D 50/20 |
| | | | | 55/347 |
| 4,746,340 A | 5/1988 | Durre et al. | | |
| 4,971,603 A | 11/1990 | Prinsloo et al. | | |
| 4,976,748 A * | 12/1990 | Prinsloo | | B04C 3/06 |
| | | | | 95/269 |
| 4,985,058 A * | 1/1991 | Prinsloo | | B04C 3/06 |
| | | | | 55/396 |
| 5,403,367 A * | 4/1995 | De Villiers | | B01D 45/16 |
| | | | | 55/320 |
| 6,004,382 A | 12/1999 | Pikesh et al. | | |
| 6,344,064 B1 * | 2/2002 | Conrad | | A47L 9/1641 |
| | | | | 15/352 |
| 7,491,254 B2 * | 2/2009 | Krisko | | B01D 46/527 |
| | | | | 55/482 |
| 7,879,123 B2 | 2/2011 | Lundquist et al. | | |
| 8,177,872 B2 * | 5/2012 | Nelson | | B01D 45/16 |
| | | | | 55/447 |
| 8,262,761 B2 * | 9/2012 | Babb | | B04C 3/04 |
| | | | | 55/346 |
| 8,425,641 B2 * | 4/2013 | Chaudhari | | B01D 50/20 |
| | | | | 55/346 |
| 9,689,334 B2 * | 6/2017 | Klassen | | F02M 35/162 |
| 9,937,457 B2 * | 4/2018 | Wuebbeling | | B04C 3/06 |
| 10,036,319 B2 * | 7/2018 | Murray | | B01D 45/16 |
| 11,311,890 B2 | 4/2022 | Schmitt et al. | | |
| 12,025,082 B2 * | 7/2024 | Caliendo | | F02M 35/044 |
| 12,030,008 B2 * | 7/2024 | Cheng | | C23C 16/45544 |
| 2005/0016138 A1 * | 1/2005 | Sheidler | | B01D 50/20 |
| | | | | 55/347 |
| 2005/0044825 A1 * | 3/2005 | Bazzarella | | H01M 8/04164 |
| | | | | 55/356 |
| 2008/0006250 A1 * | 1/2008 | Bula | | B01D 50/20 |
| | | | | 123/184.21 |
| 2010/0139633 A1 * | 6/2010 | Blossey | | B01D 45/16 |
| | | | | 123/573 |
| 2010/0275561 A1 * | 11/2010 | Lundquist | | B04C 3/06 |
| | | | | 524/570 |
| 2013/0031878 A1 | 2/2013 | Menssen | | |
| 2016/0243479 A1 | 8/2016 | Gossez et al. | | |
| 2020/0030820 A1 * | 1/2020 | Schmitt | | B04C 3/06 |
| 2020/0353394 A1 | 11/2020 | Chen et al. | | |
| 2021/0291095 A1 * | 9/2021 | Peterson | | B04C 3/00 |
| 2022/0241711 A1 * | 8/2022 | Wyatt | | B01D 45/16 |
| 2024/0165548 A1 | 5/2024 | Fernandes et al. | | |

FOREIGN PATENT DOCUMENTS

| | | |
|---|---|---|
| JP | H2-78412 A | 3/1990 |
| JP | H5-337403 A | 12/1993 |

OTHER PUBLICATIONS

Donaldson Filtration Solutions, Maintenance-Free Air Filtration, Donaldson Inertial Particle Separation Technology, Brochure No. F111219 Eng (Sep. 2014).

Japanese Patent Office, Office Action issued in counterpart Japanese Patent Application No. 2023-178188, mailed on Oct. 1, 2024.

\* cited by examiner

INERTIAL SEPARATOR AND METHOD OF USE

BACKGROUND OF THE INVENTION

Engines, whether gas turbine, gasoline, diesel, or hybrid, require a flow of air into the engine during operation. Some engines, particularly in aircraft, military, or industrial gas turbine vehicles, require an extremely high flow of air into the engine due to the high power produced. Since particulates in the air can damage these engines, inertial separators (for example, vortex air cleaners, inlet particle separators (IPS), and engine air particle separators (EAPS)) are sometimes used with engines operating under conditions where the air may contain high volumes of particulates are removed prior to entering the engine inlets. Inertial separators are particularly useful for use with aircraft, especially turbine driven types (e.g., helicopters), as, when operating close to the ground, they stir up great amounts of dirt and dust.

A single inertial separator or a plurality of inertial separators can be used with an engine, typically, each separator comprises an inlet tube having a central passage with an inlet and an outlet at opposite ends, a deflector for creating a vortex stream in the influent air to concentrate contaminant particles in the air at the periphery of the passage and clean the air at the center of the passage, and an outlet tube having a central clean air passage communicating with the central passage of the inlet tube. The relatively clean air at the center of the passage flows through the central clean air passage of the outlet tube. Typically, the exterior wall of the outlet tube defines a generally annular contaminant scavenge passage within the central passage of the inlet tube, through which pass contaminant particles while relatively clean air at the center of the passage flows through the central clean air passage of the outlet tube However, there is a need for improved inertial separators.

The present invention provides for ameliorating at least some of the disadvantages of the prior art. These and other advantages of the present invention will be apparent from the description as set forth below.

BRIEF SUMMARY OF THE INVENTION

An aspect of the invention provides an inertial separator comprising (a) an inlet tube having an inlet at an inlet end, an outlet at an opposite outlet end, an undercut, and a central passage between the inlet end and the outlet end, the outlet end including the undercut; (b) a deflector mounted in the central passage, the deflector having a plurality of spaced centrally joined helical vanes abutting the wall of the central passage; (c) a coaxially arranged outlet tube positioned within the outlet end of the inlet tube, the outlet tube having a first end and an opposite second end, the first end having an inlet, the second end having an outlet, and an outlet tube central passage between the inlet and the outlet in fluid communication with the central passage of the inlet tube, the inlet of the outlet tube being of lesser diameter than the central passage of the inlet tube, the outlet tube having a spiral ramp having a first ramp end and a second ramp end, the spiral ramp having a portion angled downwardly toward the second ramp end and the undercut; and, (d) a scavenge flow outlet adjacent the undercut and the second ramp end.

In some aspects of an inertial separator, the outlet tube includes pairs of separated tabs that prevent rotation of outlet tubes during use.

In an aspect, an inertial separator device is provided, comprising a housing including an inertial separator according to an aspect of the invention.

In another aspect, an inertial separator array is provided, comprising a housing including two or more inertial separators according to an aspect of the invention.

In another aspect, a method for processing air flow into an operating engine comprises passing air into an inlet of an outlet tube of inertial separator according to an aspect of the invention, passing scavenge-depleted air from the outlet of the outlet tube into the operating engine, and passing scavenge flow from the inertial separator through the scavenge flow outlet.

BRIEF DESCRIPTION OF THE SEVERAL VIEWS OF THE DRAWING(S)

FIG. 4B also shows particles constantly moving in the same direction at high velocities.

DETAILED DESCRIPTION OF THE INVENTION

In accordance with an aspect of the invention, an inertial separator is provided comprising (a) an inlet tube having an inlet at an inlet end, an outlet at an opposite outlet end, an undercut, and a central passage between the inlet end and the outlet end; the outlet end including the undercut; (b) a deflector mounted in the central passage, the deflector having a plurality of spaced centrally joined helical vanes abutting the wall of the central passage; (c) a coaxially arranged outlet tube positioned within the outlet end of the inlet tube, the outlet tube having a first end and an opposite second end, the first end having an inlet, the second end having an outlet, and an outlet tube central passage between the inlet and the outlet in fluid communication with the central passage of the inlet tube, the inlet of the outlet tube being of lesser diameter than the central passage of the inlet tube, the outlet tube having a spiral ramp having a first ramp end and a second ramp end, the spiral ramp having a portion angled downwardly toward the second ramp end and the undercut; and, (d) a scavenge flow outlet adjacent the undercut and the second ramp end.

In one aspect of the inertial separator, the spiral ramp comprises a helicoidal ramp.

In some aspects of an inertial separator, the outlet tube includes an anti-rotation element comprising pairs of separated anti-rotation tabs that prevent rotation of the outlet tube during use.

In another aspect, an inertial separator array is provided, comprising a housing including two or more inertial separators according to an aspect of the invention.

In another aspect, a method for processing air flow into an operating engine comprises passing air into an inlet of an outlet tube of inertial separator according to an aspect of the invention, passing scavenge-depleted air from the outlet of the outlet tube into the operating engine, and passing scavenge flow from the inertial separator through the scavenge flow outlet.

Aspects of the method for processing air flow into an operating engine can include passing air into an inlet of an outlet tube of an inertial separator device or into two or more inlet tubes of an inertial separator array according to an aspect of the invention, passing scavenge-depleted air from the outlet(s) of the outlet tube(s) into the operating engine, and passing scavenge flow from the inertial separator(s) through the scavenge flow outlet(s).

In a typical aspect of the method, the scavenge flow includes dust particles (e.g., dirt).

Aspects of the method for processing air flow into an operating engine can also include preventing and/or minimizing rotation of the inertial separator(s) during use. In one aspect of the method, a pair of anti-rotation tabs of one inertial separator contact a pair of anti-rotation tabs of an adjacent inertial separator, preventing further rotation of the inertial separators. In an aspect of the method, two or more inertial separators each comprise an outlet tube including first and second pairs of first and second anti-rotation tabs, wherein first and second anti-rotation tabs of the first pair of anti-rotation tabs are spaced further apart than first and second anti-rotation tabs of the second pair of anti-rotation tabs, and one pair of first and second anti-rotation tabs of one inertial separator contact one pair of first and second anti-rotation tabs of an adjacent inertial separator, preventing further rotation of the adjacent inertial separators.

Advantageously, inertial separators according to aspects of the invention allow air flow therethrough with reduced interference, requiring less scavenge flow. The circular flow inside the central portion of the separator is reinforced by the scavenge lower pressure and rotational movement. Moreover, scavenge flow from a plurality of separators can be aligned to more efficiently carry the scavenge flow (e.g., including dust) in the same direction at high velocities away from the separators, which can also reduce the possibility of backflow.

Another advantage is that scavenge flow is directional and defined, rather than being released in all directions.

Each of the components of the invention will now be described in more detail below, wherein like components have like reference numbers.

Figure 1A:
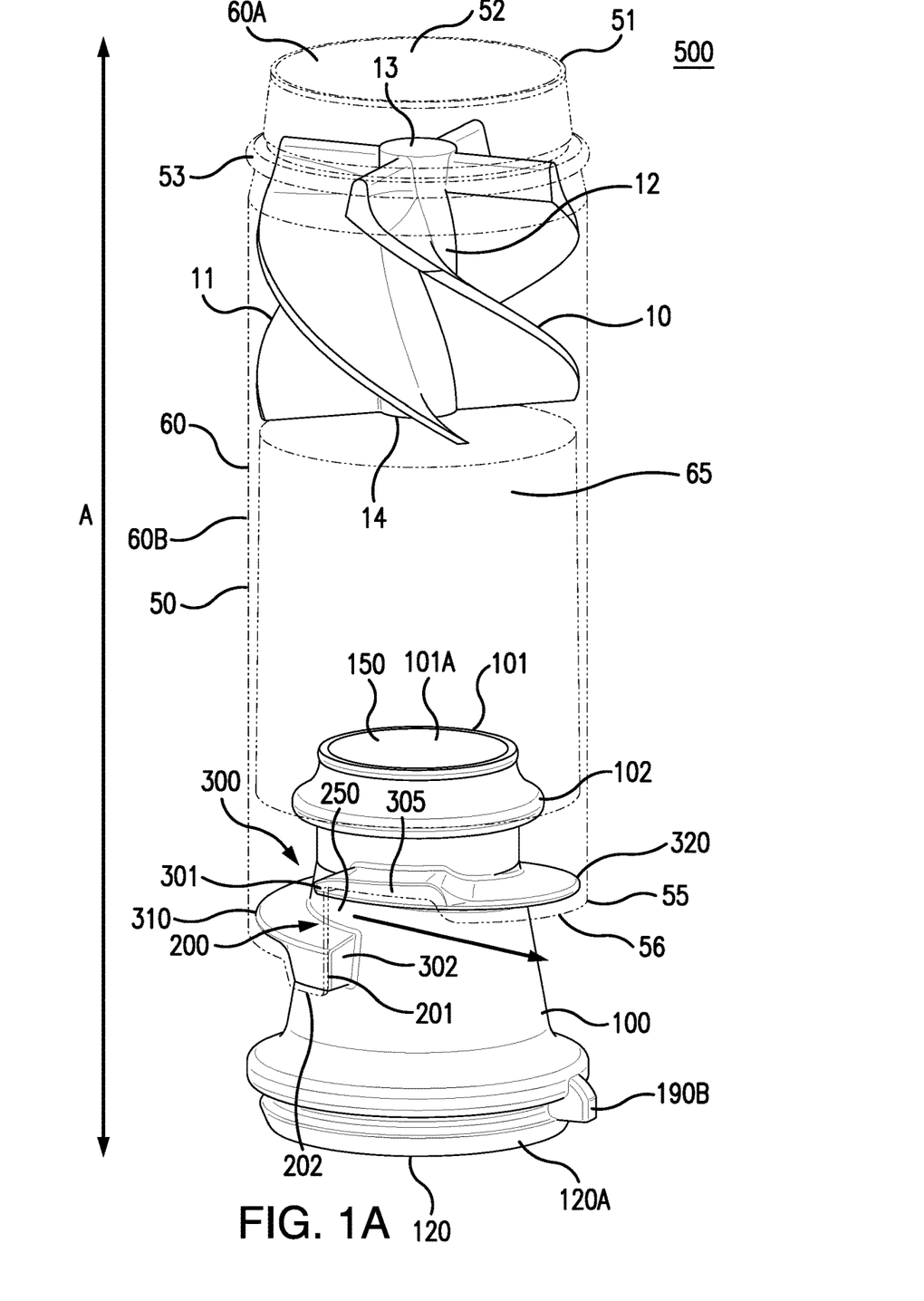
FIG. 1A is a drawing showing a side view of an inertial separator comprising an inlet tube, an undercut, a deflector (sometimes referred to as a "swirler" or a "spinner"), an outlet tube with an anti-rotation tab, a spiral ramp, a scavenge flow outlet, and scavenge flow according to an aspect of the invention.
Figure 1B:
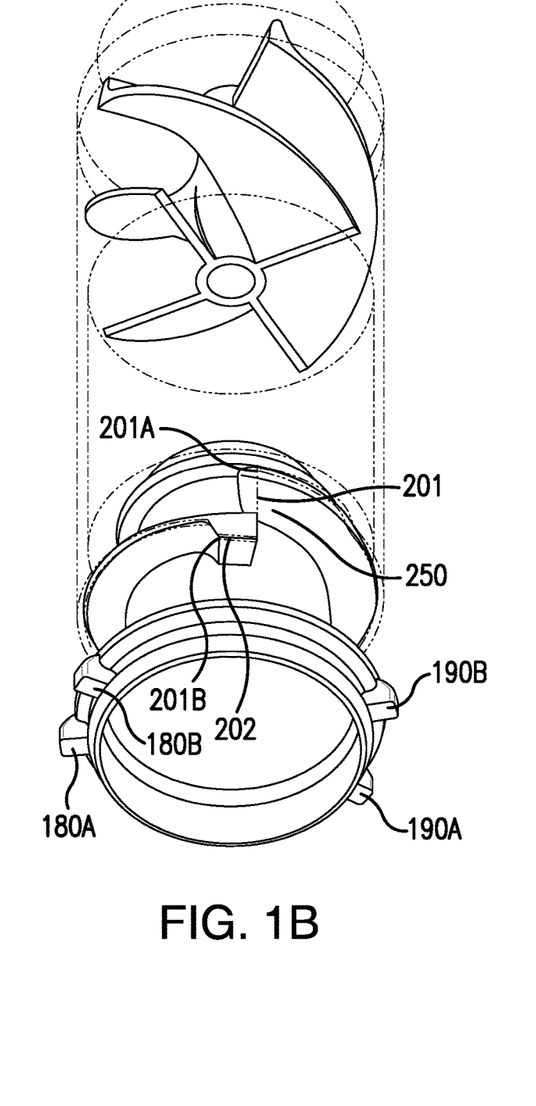
FIG. 1B is an angled bottom view of the inertial separator shown in FIG. 1A, also showing pairs of spaced apart anti-rotation tabs.

Using the aspect illustrated in FIGS. 1A and 1B for reference, an inertial separator 500 comprises an inlet tube 50 having an inlet 51 at an inlet end 52, an outlet 55 at an opposite outlet end 56, an undercut 200, a wall 60 having an inner wall surface 60A and an outer wall surface 60B, and a central passage 65 between the inlet end 52 and the outlet end 56, wherein the central passage is bounded by the inner wall surface 60A of the inlet tube; the outlet end 56 including the undercut 200; a deflector 10 mounted in the central passage, the deflector having a plurality of spaced centrally joined helical vanes 11 abutting the inner wall 60A; a coaxially arranged outlet tube 100 positioned within the outlet end 56 of the inlet tube 50, the outlet tube 100 having a first end 101 and an opposite second end 120, the first end having an inlet 101A, the second end 120 having an outlet 120A, and an outlet tube central passage 150 between the inlet 101A and the outlet 120A in fluid communication with the central passage 65 of the inlet tube, the inlet 101A of the outlet tube being of lesser diameter than the central passage 65 of the inlet tube, the outlet tube 100 having an outer surface having a spiral ramp 300 having a first ramp end 301 and a second ramp end 302, the spiral ramp having a portion 310 angled downwardly toward the second ramp end and the undercut; and, a scavenge flow outlet 250 adjacent the undercut and the second ramp end.

Typically, the central passage of the inlet tube has an inner diameter that is constant from the inlet end to the outlet end.

The first end 101 of the outlet tube facing the deflector can define a thin annulus that separates clean core flow in the passage 150 from contaminant-laden peripheral flow. Some excess air can be lost in the scavenge flow to ensure that only clean air reaches the passage. The end can include a lip, e.g., a conically shaped lip, on the end of the outlet member that is within the tubular housing. The lip, if present, can, for example, form a baffle to direct contaminants, e.g., dirt particles, to the periphery of the tubular housing for discharge.

In some aspects, e.g., as illustrated in FIG. 1A, the inlet of the inlet tube further comprises a collar 53 that will typically be deformed once the separator is installed in a housing.

The deflector is coaxially mounted in the central passage at the inlet of the inlet tube, for example, by injection molding (e.g., "one shot" molding), at the points where the vanes 11 abut the inner wall of the inlet tube. The deflector 10 has a plurality of spaced centrally joined helical vanes 11 abutting the wall of the central passage, and positioned at an angle to a line of air flow from the inlet to the outlet, so as to create a vortex stream of influent air centrifugally concentrating contaminant particles in the air at the periphery of the passage, and leaving air at the center of the passage relatively free from contaminant particles The illustrated vanes are helical and are formed to a pitch length. The deflector can have any suitable length, in a typical embodiment, the vanes occupy in the range of from about 2% to about 20% of the length of the inlet tube. In the embodiment illustrated in FIG. 1A, the deflector 10 has a cylindrical hub 12 (which is typically hollow) which extends beyond the vanes on the upstream side thereof to form a tip 13 (shown as a blunt tip), and extends on the downstream side to form a tip 14, that can be in the form of, for example, a blunt tip or a conical tip, e.g., formed to a cone angle in the range of from about 30° to about 60°. Other shapes for either of the tips are encompassed by the invention, for example, the upstream tip can have a dome like shape.

Figure 1C:
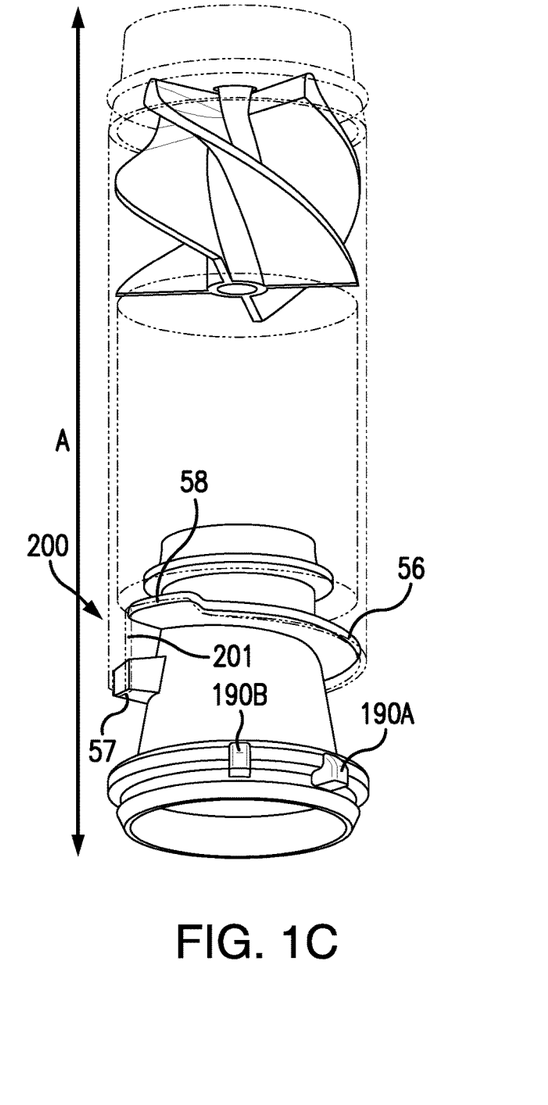
FIG. 1C is a drawing showing a side view of the inertial separator as shown in FIG. 1A.
Figure 2A:
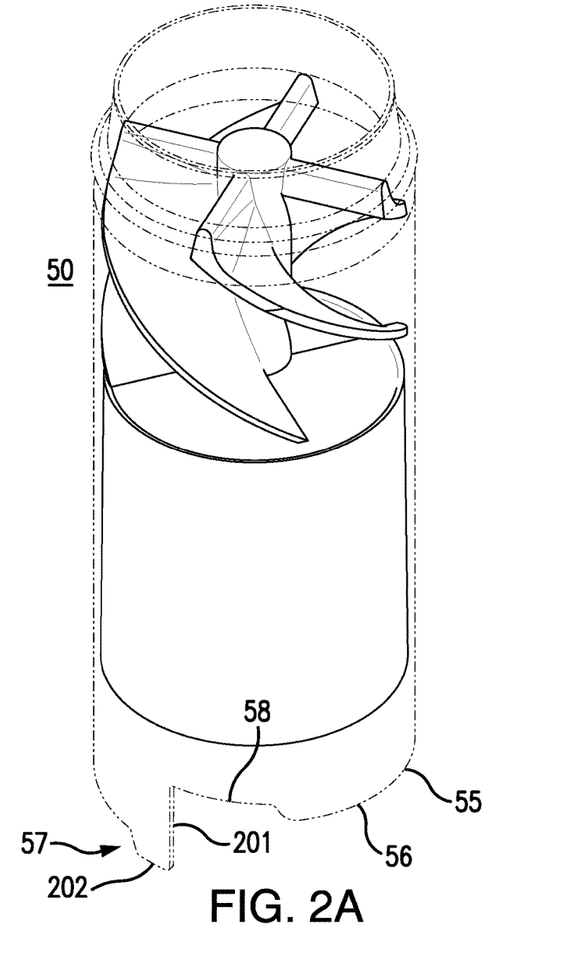
FIG. 2A is a drawing showing a top view of the inlet tube shown in FIG. 1A.
Figure 2B:
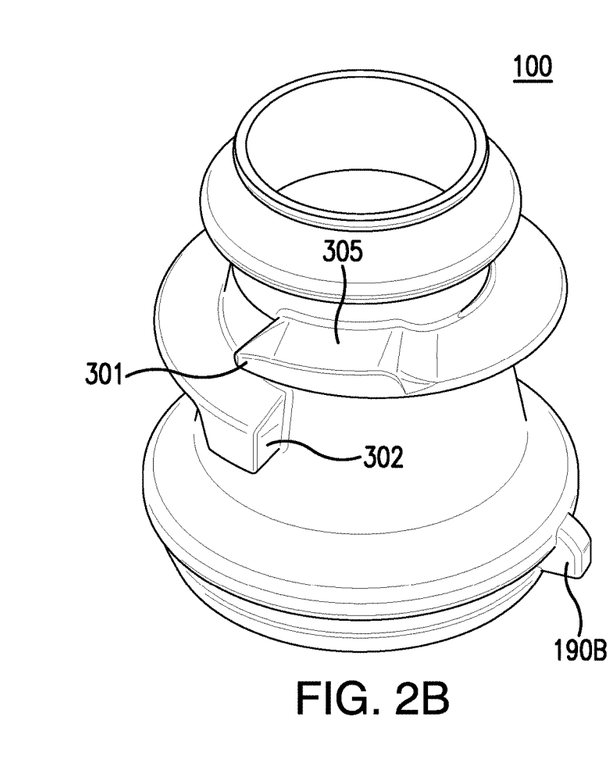
FIG. 2B is a drawing showing a top view of the outlet tube shown in FIG. 1A.

The undercut 200 allows one portion 57 of the outlet end 56 of the inlet tube to extend farther downwardly toward the second end of the outlet tube than another portion 58 of the outlet end of the inlet tube (See, FIG. 1C). In the illustrated aspect (see, FIGS. 1A-1C), the undercut has a generally vertically arranged edge 201 generally corresponding to the vertical axis "A" of the inertial separator (the vertically arranged edge having an upper end 201A closer to the first end of the outlet tube and a lower end 201B closer to the second end of the outlet tube, see, FIG. 1B), and a generally horizontally arranged edge 202 perpendicular to the vertically arranged edge, wherein the upper surface of the second ramp end is located between the upper and lower ends 201A, 201B of the vertically arranged edge 201, and the second ramp end 302 is generally aligned with the vertically arranged edge. In some other aspects (not shown) the second ramp end 302 is not generally aligned with the vertically arranged edge, e.g., the end 302 angles downwardly with respect to the vertically arranged edge.

The outlet tube 100 is coaxially positioned within the outlet end 56 of the inlet tube, the outlet tube having an inlet 101A at the first end 101 (the first end extending into the outlet end of the first tube), an outlet 120A at an opposite second end 120, and an outlet tube central passage 150 between the first end and the second end for delivery of clean air from the central portion of the central passage of the first tube (i.e., the outlet tube central passage between the inlet and the outlet of the outlet tube is in fluid communication with a central portion of the central passage of the inlet tube). In the illustrated aspect, the outlet tube is generally tapered (e.g., having a frustoconical shape).

In the illustrated aspects, the outlet tube includes a peripheral or circumferential ring 102 attached to the outlet tube near the inlet end. The ring can provide some flow restriction and possibly "bounce" particles toward the scavenge passage.

Figure 3:
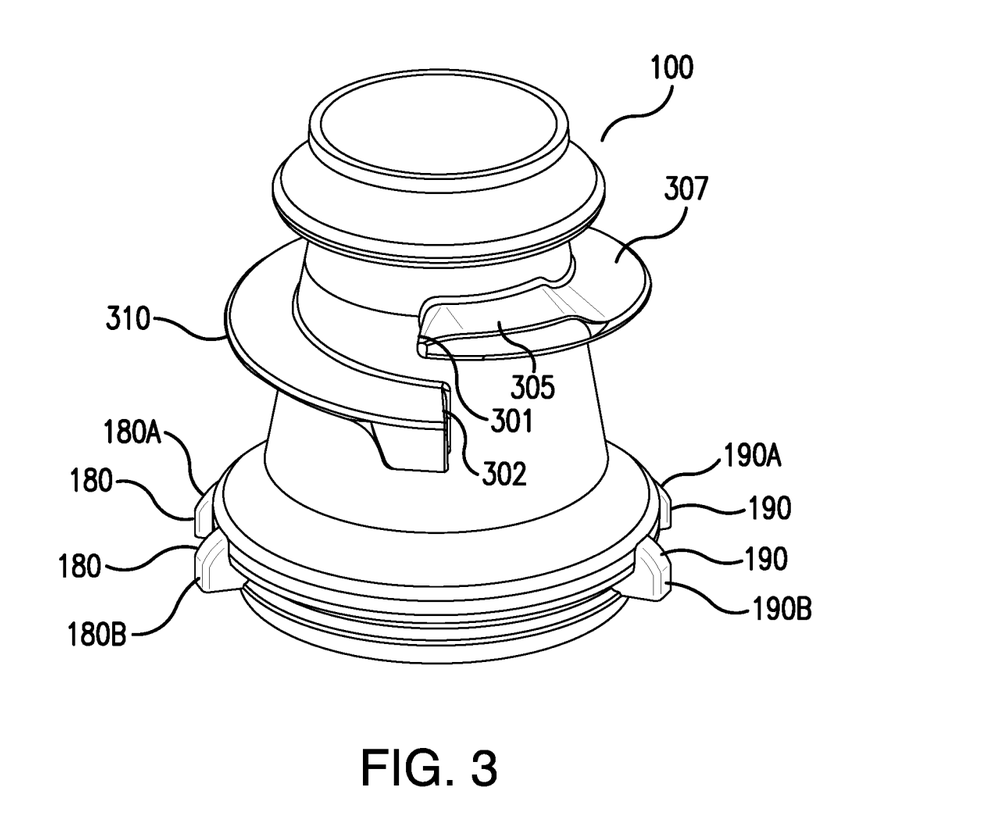
FIG. 3 is a drawings showing an angled side view of the outlet tube shown in FIG. 1A, showing pairs of spaced apart anti-rotation tabs arranged to contact spaced apart anti-rotation tabs on adjacent inertial separators.
Figure 4A:
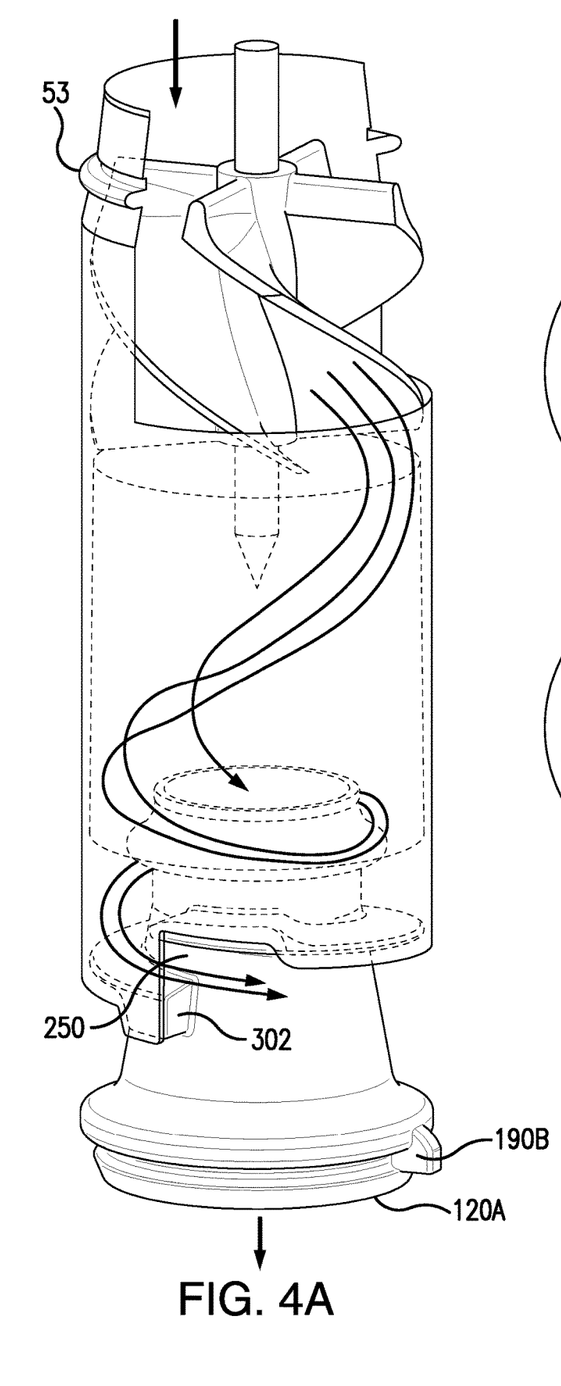
FIG. 4A is a drawing showing, diagrammatically, air and scavenge flow through an inertial separator according to an aspect of the invention.
Figure 4B:
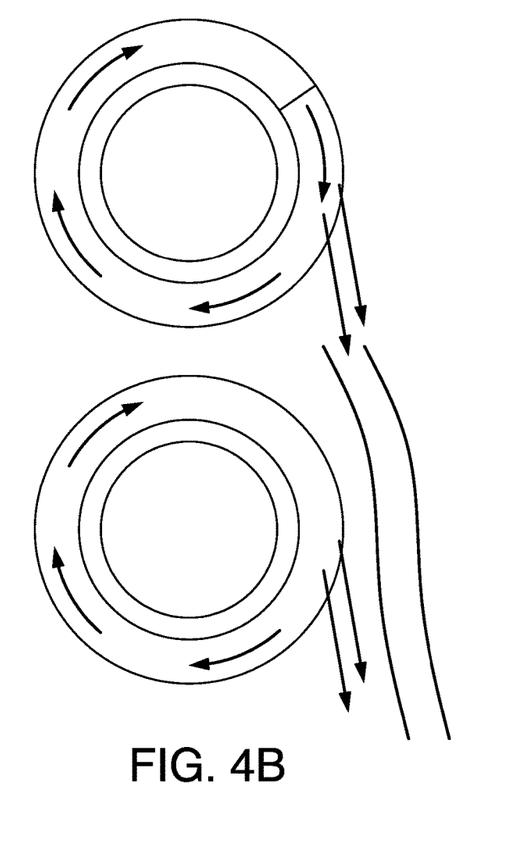
FIGS. 4B and 4C are top view drawings showing, diagrammatically, aligned scavenge flow through a plurality of inertial separators and scavenge flow outlets according to an aspect of the invention.
Figure 4C:
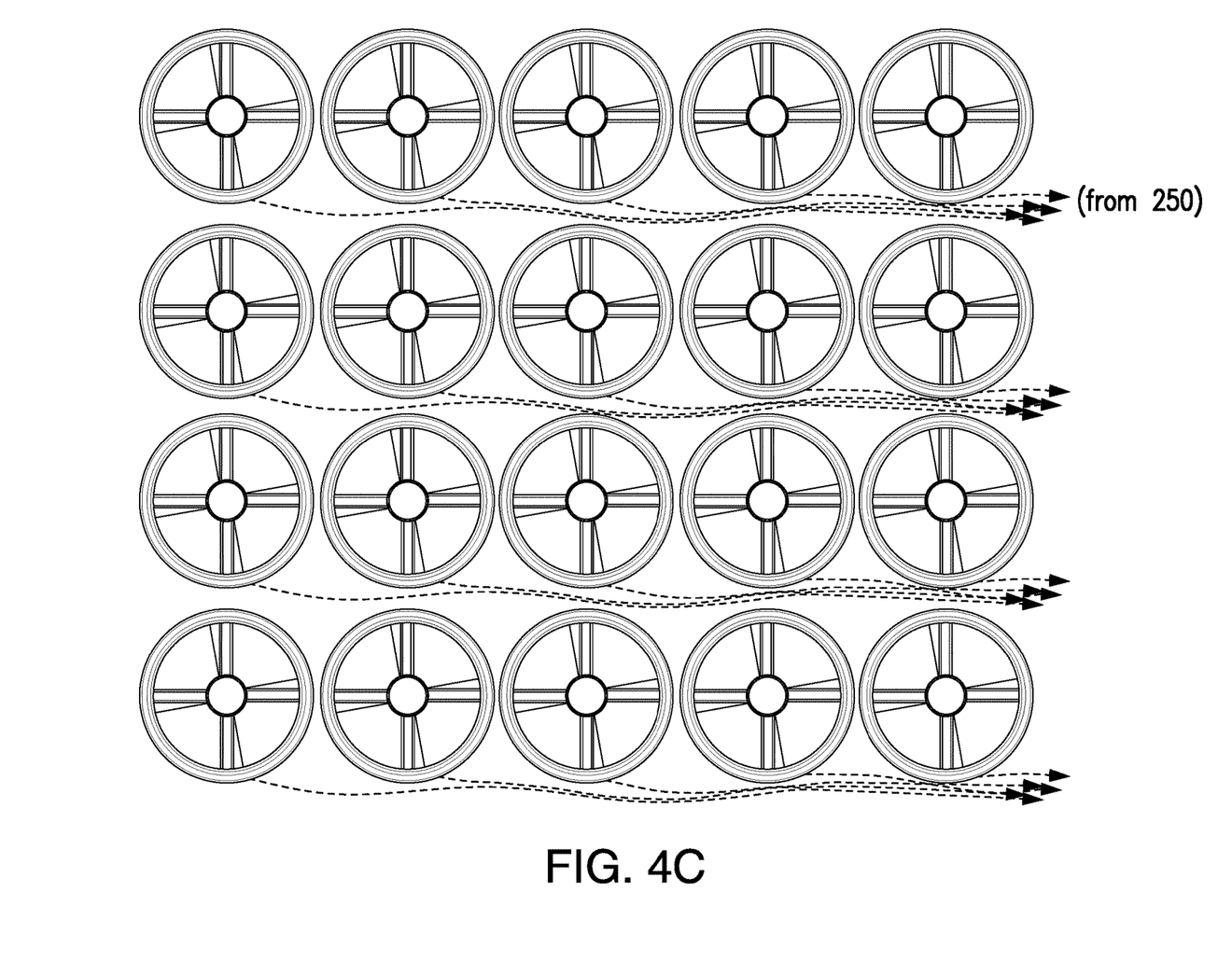

The outlet tube includes a circumferential spiral ramp 300 attached to/projecting from the outer surface of the outlet tube between the first and second ends of the outlet tube. The spiral ramp has a first ramp end 301 and a second ramp end 302, a top ramp surface 307 (see, FIG. 3A) extending from the first ramp end to the second ramp end, and an ramp outer side wall, wherein the first ramp end is above the second ramp end (i.e., the first ramp end is closer to the first end of the outlet tube than the second ramp end, the second ramp end being closer to the second end of the outlet tube than the first ramp end). Preferably, as shown in FIGS. 1A, and 3A-3B, the spiral ramp is a single pass, e.g., the ends of the spiral ramp do not overlap or only slightly overlap, and with respect to the vertical axis of the separator the second ramp end does not extend, or extends somewhat (e.g., about 15%), past the first ramp end.

Typically, the ramp constitutes a flow restrictor and reduces the diameter of the central passage of the inlet tube at the ramp to provide a scavenge flow path (shown formed in FIGS. 1A, 4A, 5, and 6 for the removal of contaminant particles, e.g., dirt from the separator) exiting the separator via the scavenge flow outlet adjacent the inlet tube undercut. The ramp can restrict flow through the annular passage to ensure that the pressure in the central passage 65 is higher than at the scavenge flow outlet. The outer side wall/edge 320 of the ramp preferably contacts (and is more preferably sealed to, e.g., by a friction fit) the inner wall surface 60A of the inlet tube (preferably the outer side wall/edge 320 contacts and seals from one end of the ramp to the other end), e.g., for supporting the outlet tube in position within the inlet tube.

In the illustrated aspect, the spiral ramp 300, which can comprise a helicoidal ramp, has a portion angled 310 downwardly toward the second ramp end 302 and the undercut 200, wherein the first ramp end 301 has little or no downward angle at portion 305 (see, FIGS. 1A and 3). For example, the portion 310 angled downwardly toward the second ramp end and the undercut has an angle in the range of about 1° to about 15°. In some aspects, portion 305 and groove 303 have greater thicknesses and provide for improved sealing to the inlet and outlet tubes.

If desired, the entire spiral ramp 300 can be angled downwardly toward the second ramp end 302 and the undercut 200 and/or the second ramp end can have an additional downward angle from the rest of the ramp.

As illustrated, the inlet (first end) of the outlet tube is of lesser diameter than the central passage 65 of the inlet tube. The first end of the outlet tube facing the deflector can define a thin annulus that sharply separates clean core flow in the passage from contaminant-laden peripheral flow. The end can include a lip, e.g., a conically shaped lip, on the end of the outlet tube that is within the inlet tube. The lip, if present, can, for example, form a baffle to direct contaminants, e.g., dirt particles, to the periphery of the inlet tube for discharge.

Figure 5:
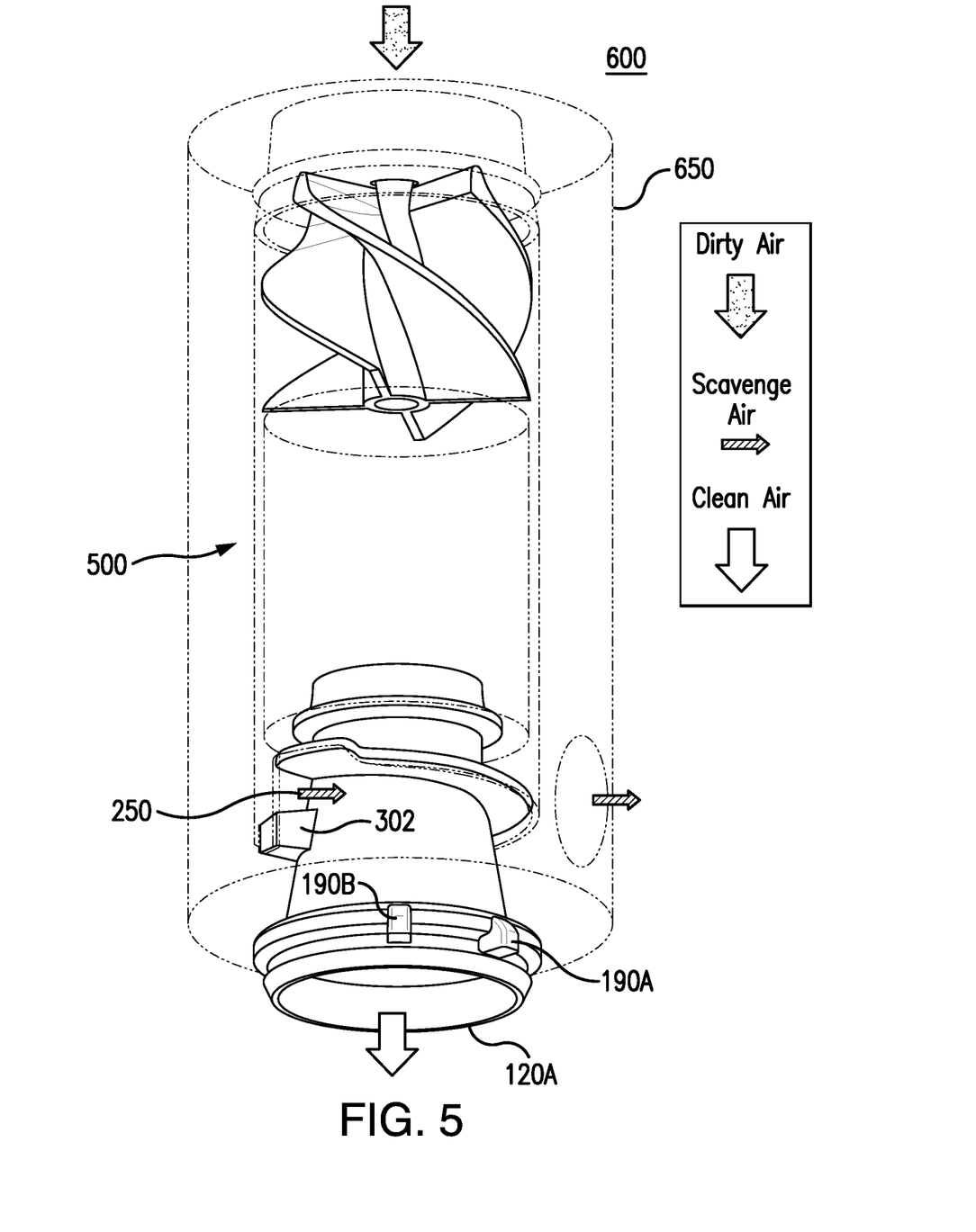
FIG. 5 is a drawing showing an inertial separator device according to an aspect of the invention, the device comprising a housing including an inertial separator as shown in FIG. 1A according to an aspect of the invention, also showing air and scavenge flow through the inertial separator device.

Using the aspect shown in FIG. 5 for reference, an inertial separator device 600 comprises an inertial separator 500 according to an aspect of the invention arranged in a housing 650.

Figure 6:
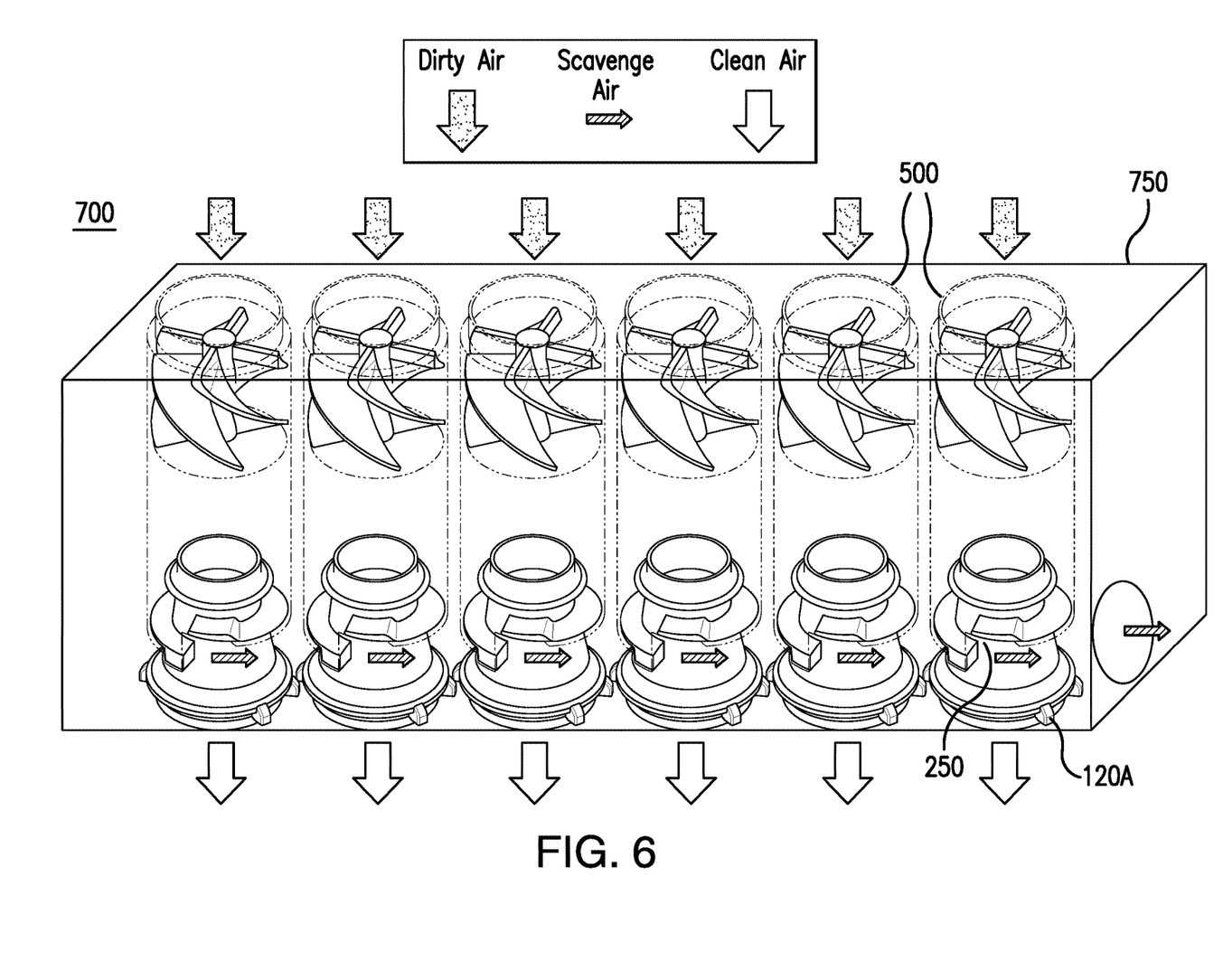
FIG. 6 is a drawing showing an inertial separator array according to an aspect of the invention, the array comprising a housing including a plurality of inertial separators as shown in FIG. 1A according to an aspect of the invention, also showing air and scavenge flow through the inertial separator array. The scavenge flow progressively increases its flow towards the scavenge exit of the system with the individual contribution of each inertial separator.

Using the aspect shown in FIG. 6 for reference, an inertial separator array comprises 700 at least two inertial (i.e., a plurality of) separators 500 according to an aspect of the invention arranged in a housing 750. An inertial separator array can comprise any number of inertial separators (e.g., tens of inertial separators, hundreds of inertial separators, thousands of inertial separators) according to an aspect of the invention arranged in a housing.

Figure 8A:
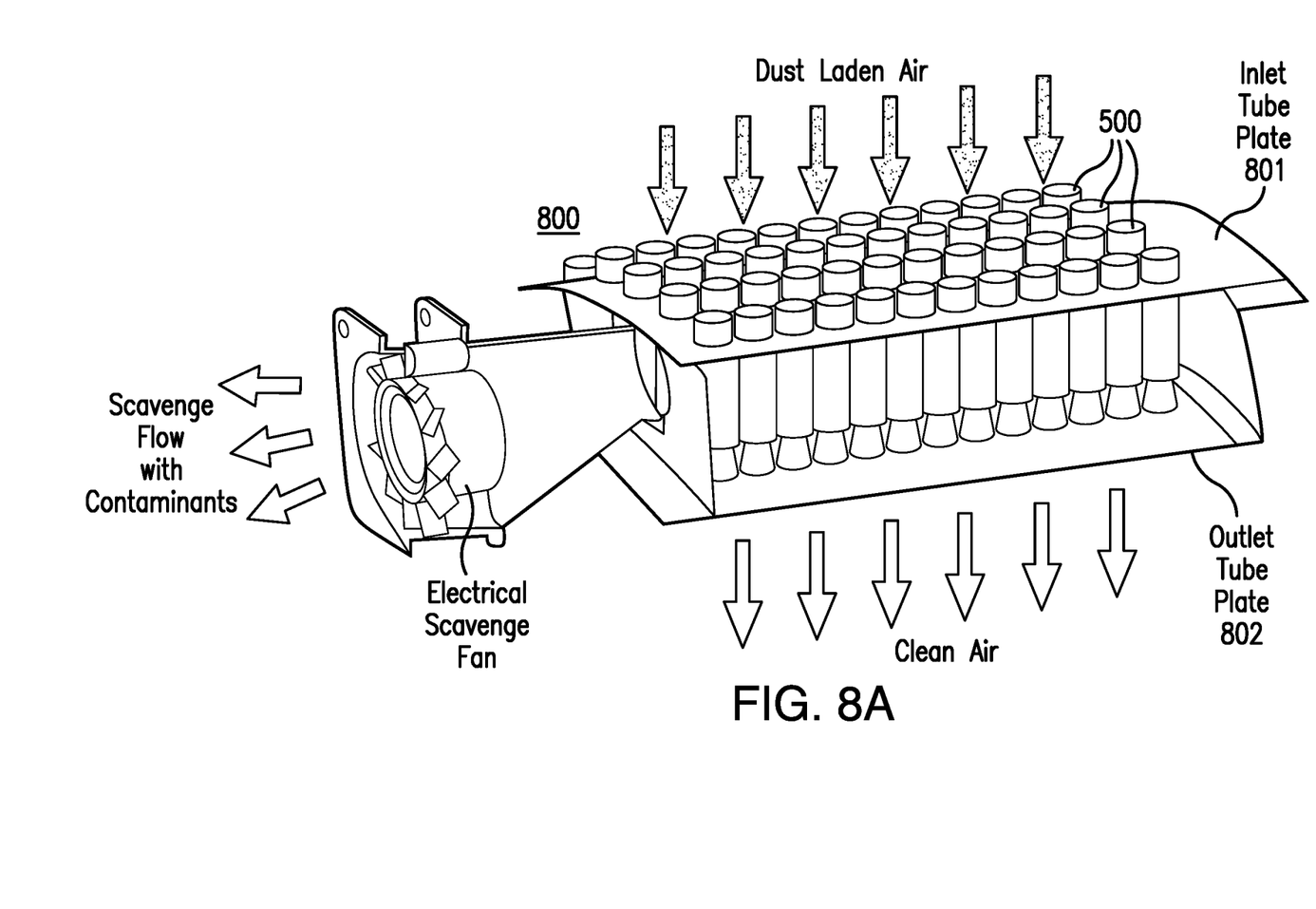
FIG. 8A is a drawing showing an inertial separator array according to an aspect of the invention in communication with a fan.
Figure 8B:
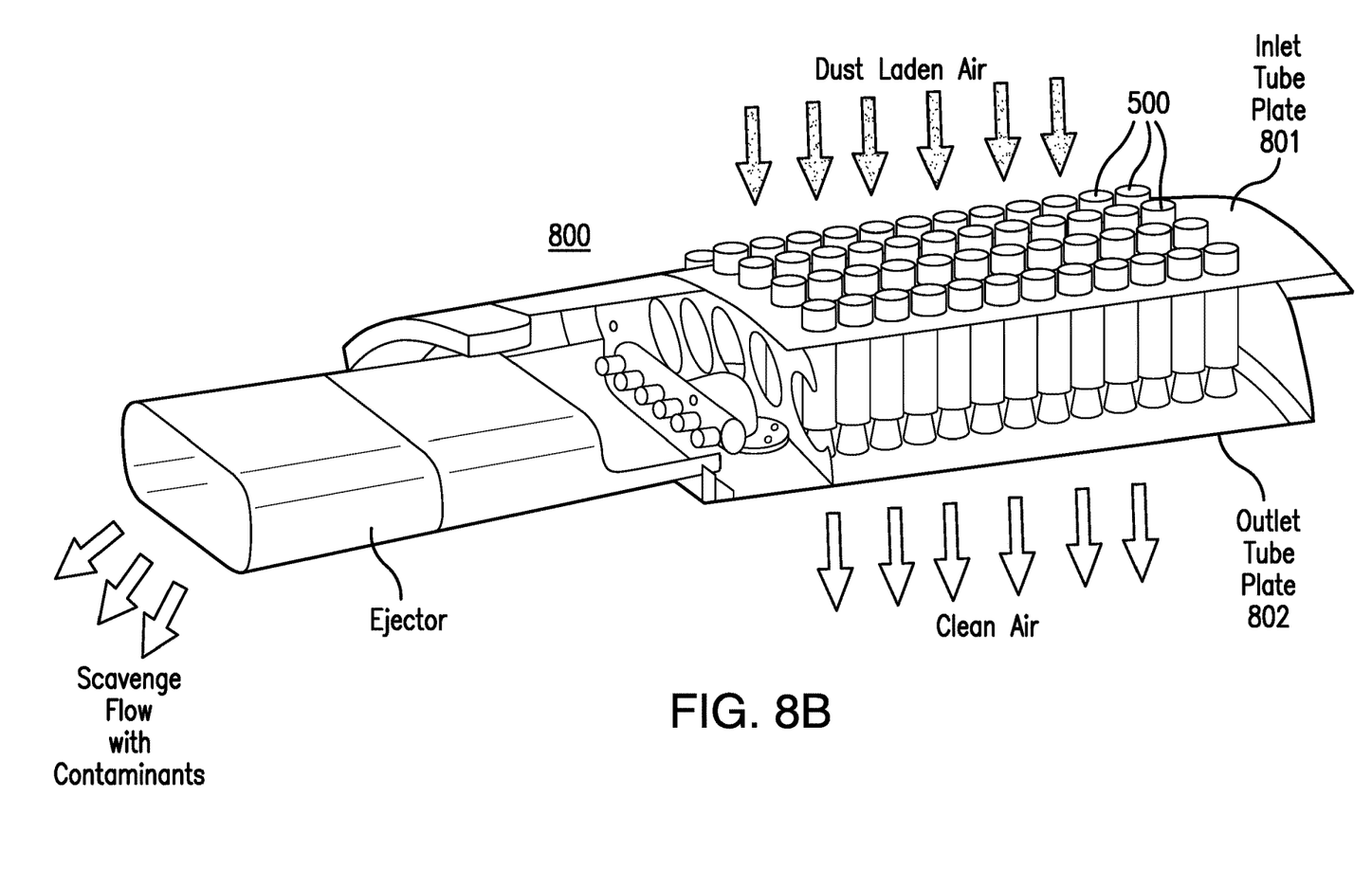
FIG. 8B is a drawing showing an inertial separator array according to an aspect of the invention in communication with an air ejector, wherein the inertial separator arrays shown in FIGS. 8A and 8B can be used with a gas turbine engine.
Figure 8C:
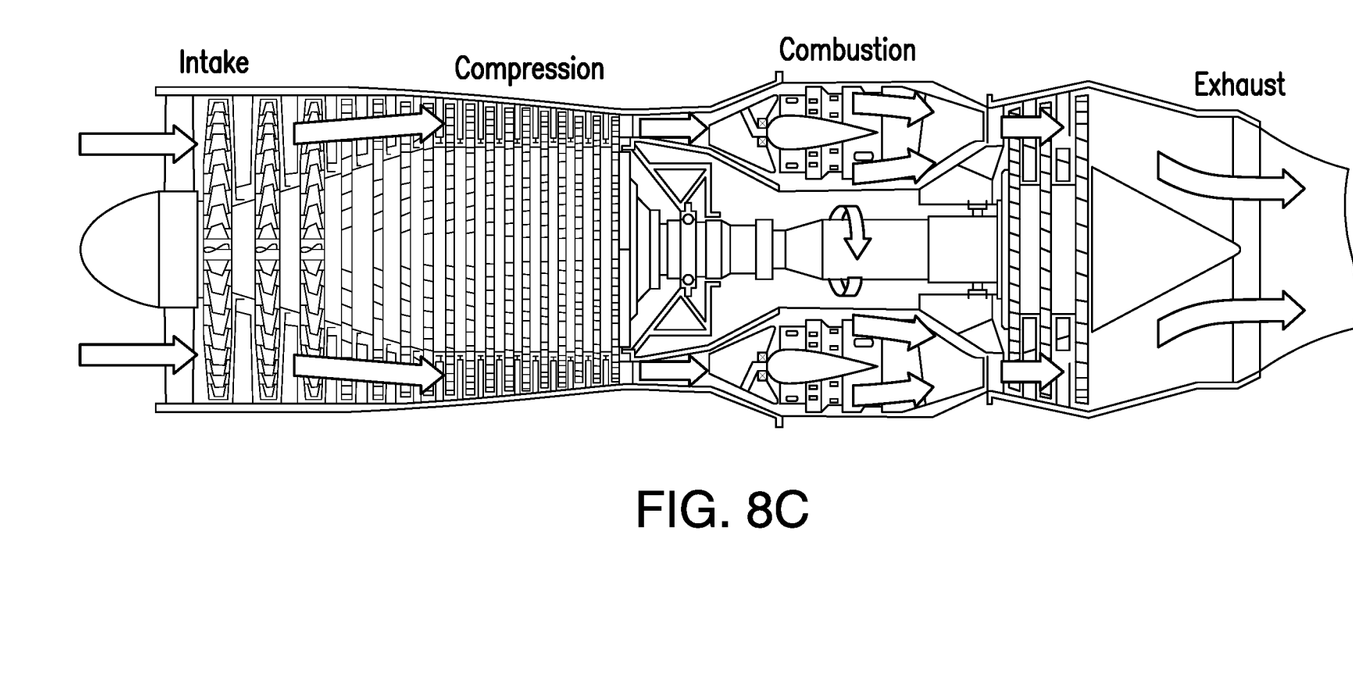
FIG. 8C is a drawing showing an illustrative turbine engine.

FIG. 8A is a drawing showing an inertial separator array 800 according to an aspect of the invention in communication with a fan, FIG. 8B is a drawing showing an inertial separator array 800 according to an aspect of the invention in communication with an air ejector, each array comprising a plurality of separators 500, mounted on inlet tube plates 801 and outlet tube plates 802, wherein the inertial separator arrays shown in FIGS. 8A and 8B can be used with a gas turbine engine, and FIG. 8C is a drawing showing an illustrative turbine engine.

As shown in FIGS. 4B, 4C, 6, 8A and 8B, the scavenge flow from the plurality of separators can be aligned to more efficiently carry the scavenge flow (e.g., including dust) in the same direction at high velocities away from the separators, and the scavenge flow does not pass into the engine inlet.

In some aspects of an inertial separator, the outlet tube includes pairs of separated anti-rotation tabs that prevent rotation of the outlet tube during use.

Figure 7A:
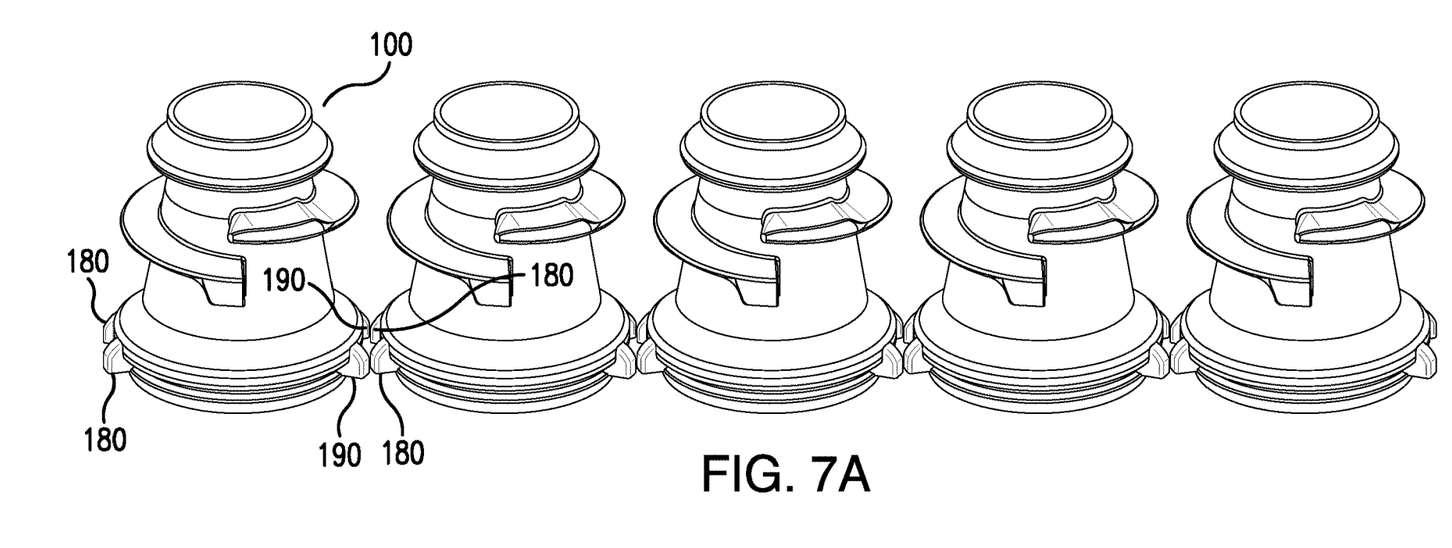
FIG. 7A is a drawing showing side views of a plurality of outlet tubes arranged for use in an inertial separator array wherein the outlet tubes include pairs of spaced apart anti-rotation tabs as shown in FIGS. 1B and 3.
Figure 7B:
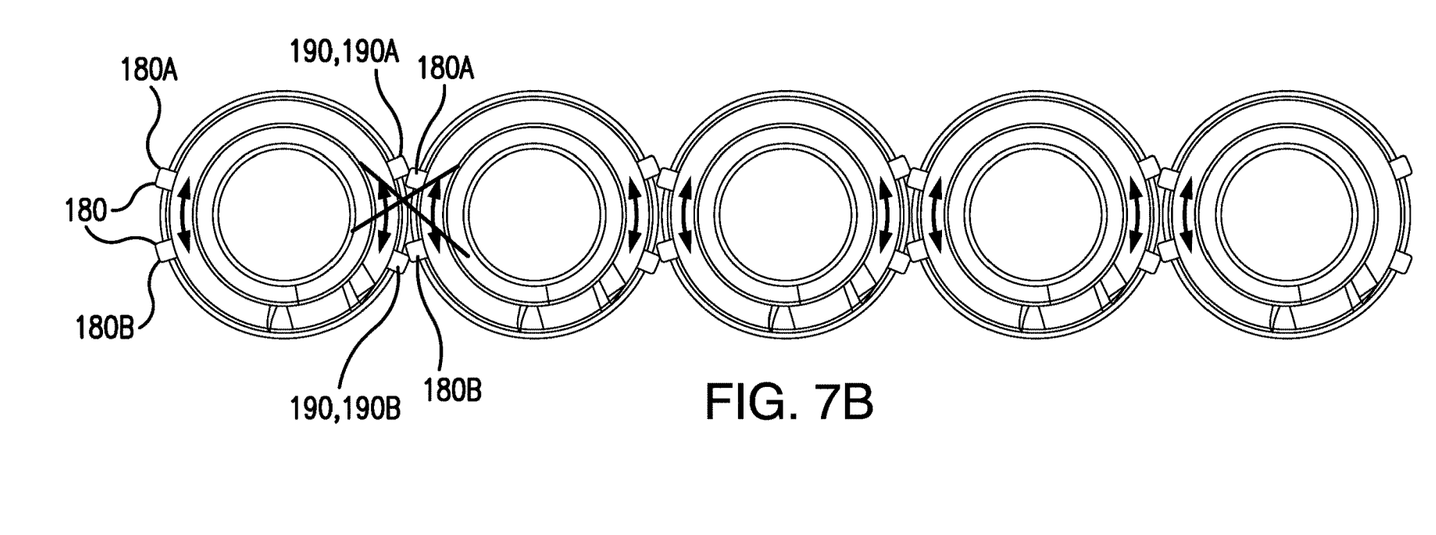
FIG. 7B is a drawing showing top views of the plurality of outlet tubes shown in FIG. 7A, wherein pairs of spaced apart anti-rotation tabs on adjacent outlet tubes prevent further rotation of the tubes (and inertial separators) during use.

For example, using the aspects illustrated in FIGS. 1B, 3, 7A, and 7B for reference, the outlet tubes each include pairs of outwardly extending anti-rotation tabs 180 (comprising first tab 180A and second tab 180B) and 190 (comprising first tab 190A and second tab 190B). The distance between the tabs in one pair is greater than the distance between the tabs in the other pair. Thus, as illustrated in FIG. 7B, the tabs in one pair having a lesser distance between them fit between, and can contact, the tabs in another pair on the adjacent inertial separator, preventing further rotation, as the tabs having the lesser distance between them cannot rotate past the tabs having the greater distance between them.

If desired, the components of the inertial separators can be fabricated from any suitable rigid impervious material, including any impervious thermoplastic material, which is compatible with the fluid being processed. Typically, the inlet tube can be fabricated from a polymer, such as an acrylic, polypropylene, polyethylene, polystyrene, or a polycarbonate resin.

If desired, inertial separators according to embodiments of the invention can be monolithic, optionally manufactured via additive manufacturing (sometimes referred to as "additive layer manufacturing" or "3D printing"). They are typically formed by repeated depositions of a metal powder bound together with an activatable binder (e.g., binder jetting, sometimes referred to as "drop on powder"), typically followed by agglomerating the powder, e.g., by sintering. The components can be manufactured together via additive manufacturing in a continuous operation at substantially the same time. Any suitable additive manufacturing equipment can be used, and a variety of production 3D printers are suitable and commercially available.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An inertial separator comprising
(a) an inlet tube having an inlet at an inlet end, an outlet at an opposite outlet end, the outlet end including an undercut, a central passage between the inlet end and the outlet end; the outlet end including the undercut;
(b) a deflector coaxially mounted in the central passage, the deflector having a plurality of spaced centrally joined helical vanes abutting the wall of the central passage;
(c) a coaxially arranged outlet tube positioned within the outlet end of the inlet tube, the outlet tube having a first end and an opposite second end, the first end having an inlet, the second end having an outlet, and an outlet tube central passage between the inlet and the outlet in fluid communication with the central passage of the inlet tube, the outlet tube including first and second pairs of first and second anti-rotation tabs, wherein first and second anti-rotation tabs of the first pair of anti-rotation tabs are spaced further apart than first and second anti-rotation tabs of the second pair of anti-rotation tabs,
the inlet of the outlet tube being of lesser diameter than the central passage of the inlet tube, the outlet tube having an outer surface having a spiral ramp having a first ramp end and a second ramp end, the spiral ramp having a portion angled downwardly toward the second ramp end and the undercut; and,
(d) a scavenge flow outlet adjacent the undercut and the second ramp end.

2. The inertial separator of claim 1, wherein the spiral ramp comprises a helicoidal ramp.

3. The inertial separator of claim 2, wherein the spiral ramp comprises an outer side wall sealed against an inner wall surface of the inlet tube.

4. The inertial separator of claim 1, wherein the spiral ramp comprises an outer side wall sealed against an inner wall surface of the inlet tube.

5. A method of processing air flow into an operating engine, the method comprising:
passing air into an inlet of an inertial separator comprising
(a) an inlet tube having the inlet at an inlet end, an outlet at an opposite outlet end, the outlet end including an undercut, and a central passage between the inlet end and the outlet end; the outlet end including the undercut;

(b) a deflector coaxially mounted in the central passage, the deflector having a plurality of spaced centrally joined helical vanes abutting the wall of the central passage;

(c) a coaxially arranged outlet tube positioned within the outlet end of the inlet tube, the outlet tube having a first end and an opposite second end, the first end having an inlet, the second end having an outlet, and an outlet tube central passage between the inlet and the outlet in fluid communication with the central passage of the inlet tube, the outlet tube including first and second pairs of first and second anti-rotation tabs, wherein first and second anti-rotation tabs of the first pair of anti-rotation tabs are spaced further apart than first and second anti-rotation tabs of the second pair of anti-rotation tabs, the inlet of the outlet tube being of lesser diameter than the central passage of the inlet tube, the outlet tube having an outer surface having a spiral ramp having a first ramp end and a second ramp end, the spiral ramp having a portion angled downwardly toward the second ramp end and the undercut; and, (d) a scavenge flow outlet adjacent the undercut and the second ramp end; and, passing scavenge-depleted air from the outlet of the outlet tube into the operating engine, and passing scavenge flow from the inertial separator through the scavenge flow outlet.

6. The method of claim 5, wherein the scavenge flow includes dirt.

7. The method of claim 6, including preventing or minimizing rotation of the inertial separator.

8. The method of claim 6, passing air into separate inlets of two or more inertial separators, and passing scavenge-depleted air from separate outlets of separate outlet tubes of the two or more inertial separators into the operating engine, and passing scavenge flow from the inertial separator through separate scavenge flow outlets.

9. The method of claim 5, including preventing or minimizing rotation of the inertial separator.

10. The method of claim 9, passing air into separate inlets of two or more inertial separators, and passing scavenge-depleted air from separate outlets of separate outlet tubes of the two or more inertial separators into the operating engine, and passing scavenge flow from the inertial separator through separate scavenge flow outlets.

11. The method of claim 5, passing air into separate inlets of two or more inertial separators, and passing scavenge-depleted air from separate outlets of separate outlet tubes of the two or more inertial separators into the operating engine, and passing scavenge flow from the inertial separator through separate scavenge flow outlets.

12. The method of claim 11, wherein the two or more inertial separators each comprise an outlet tube including first and second pairs of first and second anti-rotation tabs, wherein first and second anti-rotation tabs of the first pair of anti-rotation tabs are spaced further apart than first and second anti-rotation tabs of the second pair of anti-rotation tabs, and one pair of first and second anti-rotation tabs of one inertial separator contact one pair of first and second anti-rotation tabs of an adjacent inertial separator, preventing further rotation of the adjacent inertial separators.

* * * * *